Oct. 19, 1965     J. C. MATHEWS ETAL     3,212,595

SELF-PROPELLED LITTER

Filed Dec. 31, 1962     2 Sheets-Sheet 1

Inventors:
John C. Mathews
Lloyd C. Erickson
By: Hofgren, Brady, Wegner,
Allen & Stellman
Attorneys

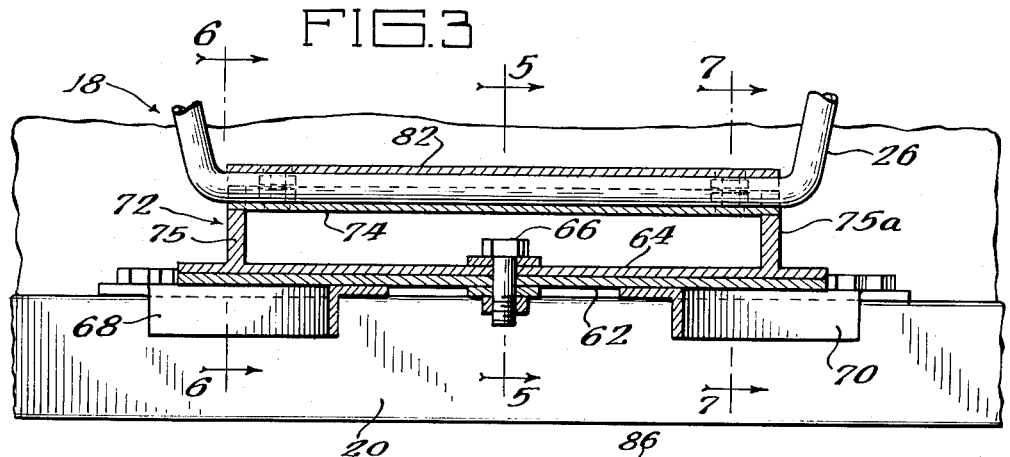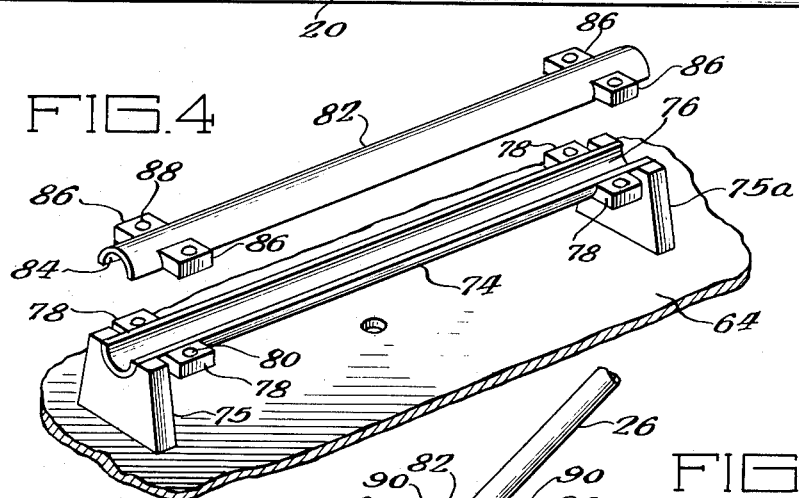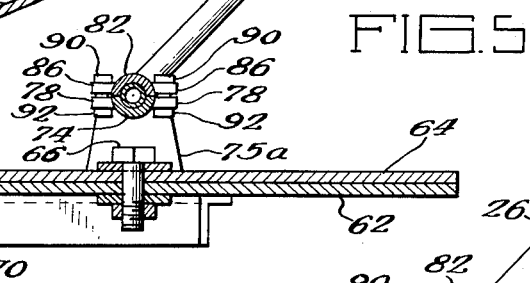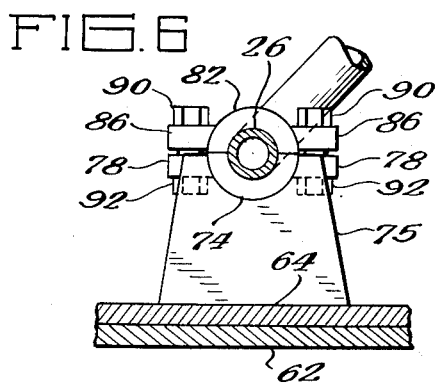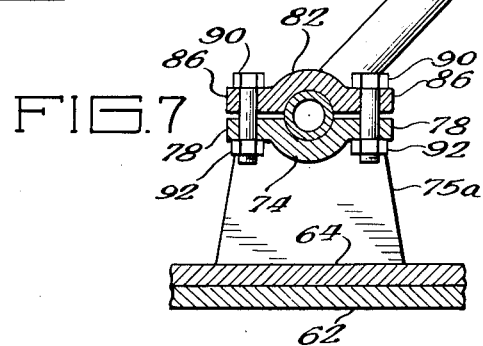

United States Patent Office 3,212,595
Patented Oct. 19, 1965

3,212,595
SELF-PROPELLED LITTER
John C. Mathews and Lloyd C. Erickson, Elwood, Ill.
Filed Dec. 31, 1962, Ser. No. 248,667
4 Claims. (Cl. 180—19)

This invention relates to self-propelled litters and more particularly to a monowheel motorized litter for carrying objects over rough terrain and also adapted to serve as a trailer vehicle.

Self-propelled litters which utilize a wheel driven by a motorcycle motor or the like and controlled by a motorcycle-type handle bar controls are generally old in the art. Many such devices have been developed for carrying objects, such as game, supplies, and the like over rough terrain or for extended distances. These litters are extremely useful to hunters of relatively large animals, such as deer and the like. Such litters generally require only one operator who, with the appropriate motorcycle-type controls therefor, can adequately drive the litter over rough terrain with a load thereon. However, these litters have not been adapted to function as towed trailer devices. Thus, the load transported by the litter must be placed on a separate trailer to be towed by a vehicle. Moreover, the litter itself must be placed on a separate vehicle to be transported for great distances.

It is therefore the primary object of this invention to provide a new and improved self-propelled litter.

It is another object of this invention to provide a new and improved self-propelled litter adapted to serve as a vehicle trailer for towing loads carried thereon.

It is still another object of this invention to provide a new and improved self-propelled litter comprising a frame having a motor and a wheel mounted thereon with appropriate controls therefor, and hitch means at one end adapted to mate with an appropriate hitch secured to the rear of a vehicle so that the litter may serve as a towed trailer.

It is another object of this invention to provide a new and improved frame for a self-propelled litter.

It is still another object of this invention to provide a new and improved frame for a self-propelled litter having a substantially rectangular bed portion and a motor and wheel mount secured thereto and centrally positioned therebelow, and including a plurality of struts secured to said bed and said mount and combining therewith to form a plurality of substantially triangular substructures to produce a frame of increased strength and rigidity.

Other objects, features and advantages of the present invention will be apparent from the following description of the preferred embodiment illustrated in the accompanying drawings, in which:

FIGURE 1 is a side elevational view of the self-propelled litter of this invention and the hitch therefor showing the litter hitched to the rear of an automobile or the like;

FIGURE 2 is a top plan view of the self-propelled litter of this invention also showing a hitch therefor secured to the rear of an automobile or the like;

FIGURE 3 is an enlarged fragmentary section view taken along the line 3—3 of FIGURE 2 showing a portion of the hitch in greater detail;

FIGURE 4 is a fragmentary perspective view of the cradle assembly of a portion of the hitch for the litter of this invention;

FIGURE 5 is a fragmentary section view taken along the line 5—5 of FIGURE 3;

FIGURE 6 is an enlarged fragmentary section view taken along the line 6—6 of FIGURE 3; and FIGURE 7 is an enlarged fragmentary section view taken along the lines 7—7 of FIGURE 3.

Figure 1:
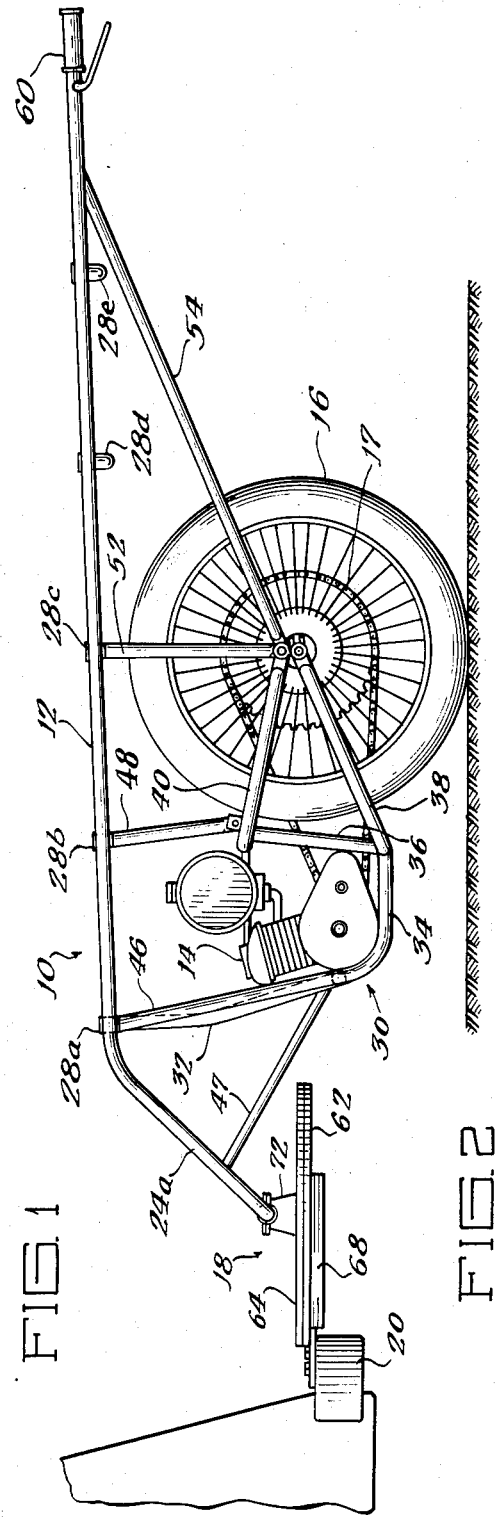
Figure 2:
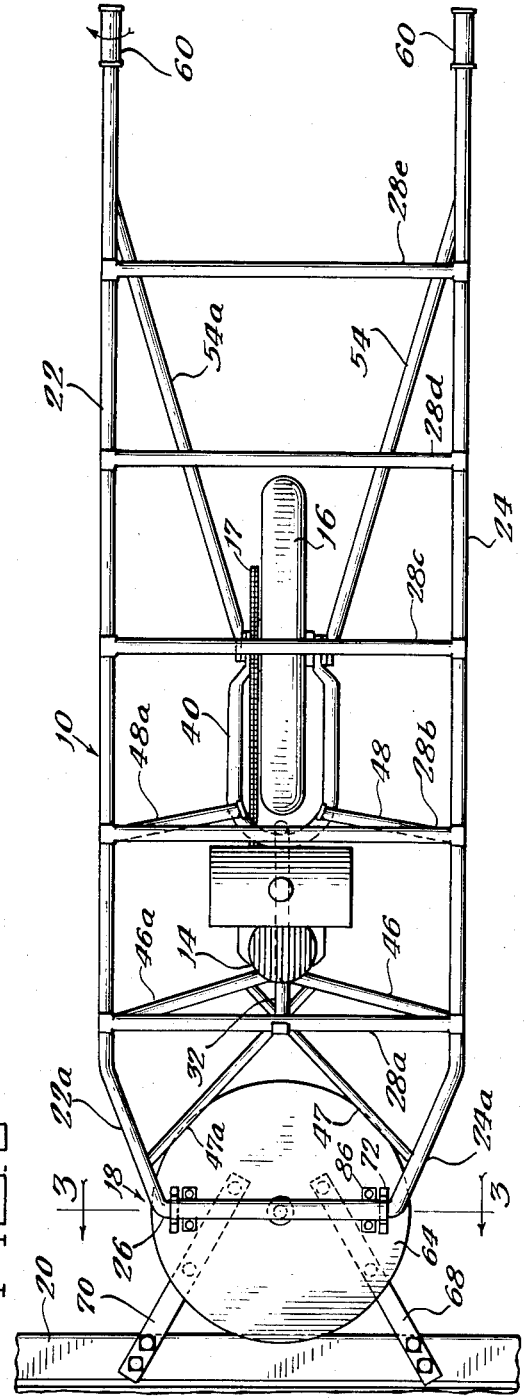

Referring now to the drawings, in FIGURE 1 there is shown a litter 10 of this invention consisting of a frame generally indicated at 12 and a motor 14 mounted therein and adapted to drive a wheel 16 rotatably mounted in the frame. A chain 17 is provided for transmitting the drive force from the motor to the wheel. The front end 12a of the frame 12 is secured to a hitch means 18 which is further attached to the bumper 20 or frame of an automobile or the like.

A frame 12 consists of tubular steel members and includes a pair of generally parallel side members 22 and 24 which converge slightly at the downwardly and inwardly extending front portions thereof 22a and 24a, respectively, and are joined by a hitch bar 26 which extends generally transverse thereto. A plurality of generally parallel spaced cross members 28a, 28b, 28c, 28d and 28e are secured at each end to the side members 22 and 24 and extend substantially perpendicular thereto and combine therewith to provide a bed portion upon which objects such as dead game or injured parties or supplies may be placed.

Secured to one of the cross members and extending therebelow is the motor and wheel mount assembly 30. Included in the motor and wheel mount assembly is the substantially downwardly extending arm 32 which is attached at its upper end to cross member 28a. The arm 32 has a substantially normal leg portion 34 at the bottom thereof which extends toward the rear of the frame 12 and provides a base upon which the motor 14 may be positioned. Further included in the motor and wheel assembly 30 is the substantially upright bar 36. The bar 36 is secured at one end to the free end of the leg 34 and is generally parallel to the bar 32. The wheel mounting yokes 38 and 40 are secured to the top and bottom of the upright bar 36. The axle 42 of the wheel 40 is commonly secured to the open ends of the yokes 38 and 40, thus securing the wheel to the frame 12.

The litter frame is further provided with a plurality of strut or support means or downwardly and inwardly extending struts. The elements of the strut means combine with other portions of the frame to form a series of generally triangular substructures to produce a frame which is extremely rigid for litters of this type. It has been found that a load of 600 pounds may be carried on this litter without damaging the frame.

The strut means includes a plurality of pairs of struts each secured at one end to the side members and at the other end to a portion of the centrally disposed motor and wheel mount. In particular, the strut means includes a pair of front struts 46 and 46a which are each secured at one end to the side members adjacent the first cross member 28a and extend downwardly and inwardly and are commonly secured to the upright member 32 of the motor and wheel mount assembly 30 near the leg 34. Front auxiliary struts 47 and 47a are provided which extend from the downwardly and inwardly extending portions of the side members and are joined to the front struts 46 and 46a near their attachment with the member 32. The next set of struts 48 and 48a are each secured at one end to each of the side members adjacent the next cross member 28b and extend downwardly and inwardly and are commonly secured to the upper yoke 40 near its juncture with the upright member 36 of the motor mount assembly 30. A third set of struts 52 are each secured at one end to each of the side members adjacent the next cross member 28c and at the opposite end are secured to the axle of the wheel 60 in common with the free open ends of the yokes 38 and 40. A pair of rear struts 54 and 54a are provided which extend from the rear of the side members 28e near the end thereof forwardly, downwardly and inwardly to the axle 42 where they are secured thereto in common with the struts 52 and the open ends of the yokes 38 and 40.

The open rear ends of the side members 22 and 24 are provided with conventional handle bar controls 60 such as are commonly found on the standard motorcycle for appropriately actuating the accelerator, clutch, and brake of the device. The litter may be easily operated by one man who may grasp the frame at the handle bar controls thereof and operate and steer the device. As is common with such litters, the gear ratio is such that at top speed the device will proceed at approximately three to five miles an hour which is equivalent to a fast walk.

The hitch 18 for this invention includes a lower plate 62 and an upper plate 64 which are rotatably secured to each other by a pivot means, such as a bolt, 66. The lower plate 62 includes a pair of arms 68 and 70 which provide a means for securing the hitch to the bumper or frame of an automobile or similar vehicle. The plates are commonly secured together so that at least a portion of the peripheries thereof are in facial engagement to limit tilting of one plate relative to the other, and thus to prevent lateral tilting of the litter while being towed.

The upper plate 64 includes the cradle assembly or socket 72 on the top thereof. The cradle assembly 72 includes a cradle base 74 supported above the plate 64 by a pair of upright stanchions 75 and 75a. The interior configuration or bearing surface 76 of the cradle base 74 is adapted to mate with a portion of the periphery of the hitch bar 26. The hitch bar and cradle assembly each have a width substantially coextensive with that of the plates to limit tilting of the bar relative to the plate and thus also prevent lateral tilting of the litter while being towed.

A plurality of outwardly extending ears 78 are formed on the cradle base 74 and have bolt holes 80 therethrough for receiving appropriate fastening means. Also included in the cradle assembly 72 is the cradle top 82. The cradle top 82 has a similar bearing surface 84 which is also adapted to mate with a portion of the periphery of the hitch bar member 26. The upper cradle member or cradle top is also provided with a plurality of outwardly extending ears 86 having bolt holes 80 therein for receiving appropriate fastening means such as bolts 90 and nuts 92 for securing the cradle top to the cradle base.

When it is desired to convert the self-propelled litter of this invention into a trailer, the chain which drives the rear wheel is dismantled by unlocking a conventional locking link thereof. The frame hitch bar 26 is then brought in registry with the cradle base 74 and placed therein. The cradle top may thence be placed thereover and the cradle base and top secured together by the bolts 90 and nuts 92. This attachment permits relative vertical movement of the litter since the frame can pivot about the mounting of the hitch member 18 in the cradle assembly 72. Also, since the cradle assembly is secured to the top plate 64 which is pivotally secured to the bottom plate 62, relative lateral movement of the litter, such as would be imparted by turning, is permitted. Thus, though the wheel 16 is fixed within the frame for rotation only, the litter may be adapted to function as a trailer and move laterally in the act of turning and vertically in the act of bouncing as is required of trailer type vehicles. Moreover, because the plates are in substantial facial engagement with each other and because the cradle assembly and hitch bar are of a width substantially coextensive with that of the plates, the litter is securely held upright against tilting in a lateral plane while being towed by a vehicle.

The device of this invention provides an extremely strong, yet easily and economically produced, frame for self-powered litters capable of carrying loads in excess of 600 pounds. Moreover, with the use of the hitch means of this invention, the litter may be easily converted into a trailer for towing loads at the rear of an automobile or similar vehicle, eliminating the need for a separate vehicle to tow loads which were transported by the litter or for transporting the litter itself.

The foregoing detailed description has been given for clearness of understanding only, and no unnecessary limitations should be understood therefrom, for some modifications will be obvious to those skilled in the art.

We claim:

1. A frame for a self-powered litter, comprising:
   a rigid truss-like frame including a load carrying portion and a motor-driven wheel supporting portion therebelow, said load carrying portion including a pair of substantially parallel side members and spaced generally parallel cross members each secured at its ends to the side members forming a bed upon which an object may be placed,
   said motor-driven wheel supporting portion including a pair of wheel yokes spaced one above the other with a wheel axle extending between and journalled at the free ends of the yokes and means rigidly connecting said yokes at their forward ends,
   a pair of frame members extending outwardly and upwardly from the wheel axle to the outer end of one of said cross members directly above the wheel yokes forming a generally triangular truss brace support for the wheel axle, said truss including said one cross member and said pair of frame members respectively connected to said wheel axle,
   a forwardly and upwardly extending motor cradle secured to the lower wheel yoke and a forward cross member for supporting a motor ahead of said wheel axle,
   pairs of additional struts between said upper wheel yoke and said motor cradle and the ends of adjacent cross members each forming a generally triangular truss brace support for said upper wheel yoke and motor cradle respectively, and
   a wheel on said wheel axle and a motor in said motor cradle arranged to drive said wheel.

2. A frame for a self-powered litter as specified in claim 1 wherein the side members of the load carrying portion are provided with another of said cross members at the front of the litter having a portion extending parallel to the wheel axle and centrally between said side members for engaging a supporting hitch member holding the litter upright for trailer load carrying purposes.

3. A frame for a self-powered litter, comprising:
   a rigid truss-like frame including a load carrying portion of side rails and spaced cross members forming an elongated generally rectangular bed for objects, and
   a motor-driven wheel frame portion rigidly secured to and bracing with said bed,
   said wheel frame portion including a pair of wheel yokes comprising an upper and a lower wheel yoke each being generally U-shaped and having a wheel axle extending between the free ends of the yokes, a motor mount member extending forwardly from said lower yoke and upwardly to the bed,
   a plurality of upwardly and outwardly extending struts secured between said wheel frame portion and bed, said struts being arranged in pairs to form generally triangular shaped truss sections with the cross members of said bed forming one side of the triangle and the lower ends of the struts being rigidly secured to close together parts of said wheel frame portion,
   a wheel on said axle and a motor on said wheel frame portion arranged to drive said wheel.

4. A frame for a self-powered litter, comprising:
   a rigid truss-like frame composed entirely of tubular components including a pair of substantially parallel side members;
   a plurality of generally parallel cross members each secured at one end thereof to said side members substantially normal thereto to form a bed upon which objects may be placed;

a motor and wheel mount centrally secured to one of said cross members and extending therebelow and rearwardly;

said mount including downwardly extending arm portions having a rearwardly extending leg at the terminus thereof and an upstanding arm secured to the free end of said leg, said mount further including a pair of wheel yokes each respectively secured at one end to one of the opposite ends of said upstanding arm;

a wheel commonly rotatably journaled at the free ends of said yokes;

and a plurality of cooperating pairs of support struts, one of said pairs having its struts respectively secured to said side members adjacent the ends of one of the cross members and its lower ends secured to the motor mount's downwardly extending arm, another pair of struts extending downwardly and inwardly from the ends of another cross member toward said upstanding arm and secured to the wheel yoke at the upper end of such arm to form a generally triangular substructure in combination with said side members and said another cross member, and additional pairs of struts between the side members of the bed and said motor and wheel mount whereby said wheel in said mount may support the side members and cross members in a position elevated above the ground.

References Cited by the Examiner
UNITED STATES PATENTS

| | | | |
|---|---|---|---|
| 579,554 | 3/97 | Blum | 180—33 X |
| 1,590,582 | 6/26 | Johnson et al. | 280—492 |
| 2,560,991 | 7/51 | Schuricht | 180—33 |
| 2,761,690 | 9/56 | Bradley | 280—47.3 |
| 2,869,661 | 1/59 | Fernandez | 180—19 |
| 2,918,296 | 12/59 | Goodale | 280—47.3 |
| 2,937,886 | 5/60 | Poole | 280—492 |
| 3,007,536 | 11/61 | Overstreet | 180—19 |
| 3,055,449 | 9/62 | Murphy | 180—19 |

MILTON BUCHLER, *Primary Examiner.*

A. HARRY LEVY, KENNETH H. BETTS, *Examiners.*